(12) United States Patent
Ikeda et al.

(10) Patent No.: US 7,496,048 B2
(45) Date of Patent: Feb. 24, 2009

(54) METHOD AND APPARATUS FOR TRANSMITTING DOWNSTREAM PROPAGATION PATH QUALITY INFORMATION IN COMPRESSED MODE

(75) Inventors: Tetsuya Ikeda, Yokohama (JP); Ryutaro Yamanaka, Yokohama (JP); Hidetoshi Suzuki, Yokosuka (JP)

(73) Assignee: Panasonic Corporation, Osaka (JP)

( * ) Notice: Subject to any disclaimer, the term of this patent is extended or adjusted under 35 U.S.C. 154(b) by 661 days.

(21) Appl. No.: 10/541,066

(22) PCT Filed: Sep. 27, 2004

(86) PCT No.: PCT/JP2004/014059

§ 371 (c)(1),
(2), (4) Date: Jun. 29, 2005

(87) PCT Pub. No.: WO2005/034555

PCT Pub. Date: Apr. 14, 2005

(65) Prior Publication Data

US 2006/0087980 A1    Apr. 27, 2006

(30) Foreign Application Priority Data

Sep. 30, 2003   (JP) ............................. 2003-341719

(51) Int. Cl.
H04J 3/16    (2006.01)
(52) U.S. Cl. ................ 370/252; 370/331; 370/395.4; 370/468
(58) Field of Classification Search ............... 370/240, 370/241, 395.4, 504, 252, 468
See application file for complete search history.

(56) References Cited

U.S. PATENT DOCUMENTS 7,372,842 B2 *  5/2008  Kim et al. ................. 370/345
2003/0087605 A1  5/2003  Das et al.
2003/0185159 A1 * 10/2003  Seo et al. ................. 370/278

FOREIGN PATENT DOCUMENTS

| EP | 1496628 | 1/2005 |
| JP | 2003204298 | 7/2003 |
| JP | 2003264862 | 9/2003 |
| JP | 2003318861 | 11/2003 |

OTHER PUBLICATIONS

PCT International Search Report dated Jan. 11, 2005.
"CQI reporting in DL Compressed Mode," 3GPP TSG RAN WG1#33, Tdoc R1-030742, New York, USA, Aug. 25-29, 2003, 4 pages.

* cited by examiner

*Primary Examiner*—Chirag G Shah
*Assistant Examiner*—Daniel Mitchell
(74) *Attorney, Agent, or Firm*—Dickinson Wright, PLLC

(57) ABSTRACT

A compressed mode outbound propagation path quality information transmitting method and an outbound propagation path quality information transmitting apparatus are disclosed that enable a mobile station to maintain reception performance virtually equal to that of a conventional compressed mode outbound propagation path quality information transmitting method, and enable operation control relating to received signal measurement and so forth necessary for generating outbound propagation path quality information transmitted on an uplink to be performed easily. Provision is made so that, in compressed mode in which transmission gap intervals appear in both a downlink and uplink, a mobile station does not carry over outbound propagation path quality information generated based on a received signal preceding the beginning of that downlink transmission gap interval until that downlink transmission gap interval and uplink transmission gap interval both end.

5 Claims, 11 Drawing Sheets

METHOD AND APPARATUS FOR TRANSMITTING DOWNSTREAM PROPAGATION PATH QUALITY INFORMATION IN COMPRESSED MODE

TECHNICAL FIELD

The present invention relates to a method whereby a data receiving-side communication apparatus reports transmission channel quality to a data transmitting-side communication apparatus in a Compressed Mode state using Automatic Repeat reQuest (ARQ) technology, and that apparatus.

BACKGROUND ART

In recent years, the HSDPA method, which greatly improves radio communication transmission speed, has been studied by the 3GPP (3rd Generation Partnership Project) As HSDPA channels in the HSDPA method, an HS-PDSCH (High Speed Physical Downlink Shared Channel) for packet data and an HS-SCCH (High Speed Shared Control Channel), which is a control channel that transmits a channelization code, multiplexing and modulation method information, and so forth, necessary for receiving this HS-PDSCH, are stipulated as a downlink (hereinafter referred to as "DL") that transmits radio signals from a base station apparatus to a mobile station, and these channels are transmitted as a set.

With the HSDPA method, an HS-DPCCH (High-Speed Dedicated Physical Control Channel) is stipulated as an uplink (hereinafter referred to as "UL") that transmits radio signals from a mobile station to a base station, and ACK/NACK signals indicating whether or not an HS-PDSCH radio signal has been received normally by a mobile station, and information on downlink propagation path quality between a mobile station and base station—specifically, a CQI (Channel Quality Indicator)—are transmitted by this HS-PDSCH. This CQI is generated based on an SNR (Signal to Noise Ratio) calculated from a CPICH (Common Pilot Channel), which is one of the DL channels, and the reference period for measurement of this SNR is called a Measurement Reference Period. The SNR is a measure indicating the propagation path conditions, and when a base station receives a CQI generated based on a high SNR, it can increase the HS-PDSCH transmission rate.

FIG. 1 shows the frame formats of an HS-SCCH, HS-PDSCH, and HS-DPCCH. With an HS-SCCH, HS-PDSCH, and HS-DPCCH, a subframe unit is composed of 3 slots. One subframe of these channels is 2 ms, and therefore five subframes of these channels are contained in one receive frame (10 ms) of a normal channel such as a DL-DPCH (Down Link Dedicated Physical CHannel) or CPCIH.

FIG. 2 shows the CPICH frame format and a more detailed illustration of the HS-DPCCH frame format. A CPICH is composed of 15 slots, this unit being called a frame. One CPICH frame is 10 ms. On the other hand, in the case of an HS-DPCCH, the first slot of any subframe is an ACK/NACK field containing an ACK/NACK signal, and the next two slots comprise a CQI field holding a CQI. An HS-DPCCH corresponding to one CPICH frame is composed of five packet data units—that is, subframes. The five HS-DPCCH subframes are designated Subframe #0, Subframe #1, Subframe #2, Subframe #3, and Subframe #4.

FIG. 3 shows the timing relationship between a CPICH measurement reference period—the basic unit used in SNR measurement—and HS-SCCH, HS-PDSCH, and HS-DPCCH subframes. Transmission from a base station is always performed with HS-SCCH slot boundaries and CPICH slot boundaries aligned, and an HS-SCCH and HS-PDSCH are transmitted as a subframe unit set with a 2-slot offset. An ACK/NACK signal corresponding to an HS-PDSCH subframe is stored in the HS-DPCCH ACK/NACK field following the elapse of 7.5 slots after reception of that subframe is started by a mobile station, and is transmitted from the mobile station to the base station.

On the other hand, a CQI transmitted held in the CQI field of an HS-DPCCH subframe is generated based on the SNR value calculated from the CPICH included in the DL every period specified by a higher-level layer—that is, every measurement reference period—irrespective of HS-PDSCH reception by a mobile station. In FIG. 3, the CQI transmitted in CQI field (n), for example, is generated based on the SNR calculated from the 3-slot measurement reference period CPICH that ends one slot before the start of CQI field (n).

The cycle for actual CQI transmission by a mobile station to a base station in the HS-DPCCH CQI field is specified by a higher-level layer. The cycle at which this CQI is actually transmitted is called the Feedback Cycle, k.

FIG. 4 shows the timing relationship between the HS-DPCCH subframe configuration and the measurement reference period corresponding to the CQI field of that subframe when feedback cycle k=1. As can be seen from FIG. 4, when feedback cycle k=1, a CQI is stored in the CQI field of all HS-DPCCH subframes. FIG. 5 shows the timing relationship between the HS-DPCCH subframe configuration and the measurement reference period corresponding to the CQI field of that subframe when feedback cycle k=3. As can be seen from FIG. 5, when feedback cycle k=3, a CQI is transmitted from the mobile station to the base station at a frequency of once every 3 times with regard to HS-DPCCH subframe units. An HS-DPCCH period in which a CQI stipulated by feedback cycle k is actually transmitted is called a "scheduled period" (also referred to in the drawings as "Scheduled pattern of CQI reports"), and CQI fields in all HS-DPCCH subframes are called "postulated periods" without regard to stipulation by feedback cycle k. Therefore, when feedback cycle k=1, all postulated periods are scheduled periods, but when feedback cycle k=3, one of three postulated periods is a scheduled period.

Next, compressed mode will be described, taking the HSDPA method as a concrete example. In cellular radio communications, different frequency bands may be used by cells of different communication methods, such as a W-CDMA cell and a GSM cell, or by cells of the same method, and in order for a mobile station to perform handover between such cells of differing frequency bands, the mobile station must receive a signal of another frequency band transmitted from the base station of another cell while communicating with the base station of the cell to which it currently belongs, and acquire beforehand information relating to the base station of the other cell. Thus, with the HSDPA method, it is stipulated that an interval (DL transmission gap interval) is to be provided in which a DL is not used to the extent that a mobile station and a base station communicating with the mobile station do not adversely affect communication, and that the mobile station should acquire control information relating to the base station of another cell in this DL transmission gap interval. The method whereby an interval is provided in which communication between a base station and mobile station is halted in HSDPA radio communication is known as compressed mode. In compressed mode, a transmission gap interval may be provided only in a UL, or may be provided in both the UL and DL. Furthermore, in compressed modes in methods other than HSDPA, also, downlink propagation path quality information is transmitted from a mobile station to a base station by means of virtually the same method as described above.

FIG. 6 shows an example of the timing relationship between a DL transmission gap interval, measurement reference periods, and a UL transmission gap interval in the case where feedback cycle k=1 in the compressed mode being standardized by the 3GPP. The timing relationship between the DL transmission gap interval and UL transmission gap interval is not necessarily as shown in FIG. 6, but depends on the compressed mode stipulations.

If a measurement reference period and DL transmission gap interval overlap, an SNR cannot be calculated accurately for that measurement reference period even if the overlap includes only part of the measurement reference period. Therefore, CPICH measurement reference period Reference Periods_C shown in FIG. 6 is not used, but instead a CQI is generated based on immediately preceding measurement reference period Reference Periods_B that does not overlap the DL transmission gap interval, and this generated CQI is transmitted from the mobile station to the base station in the first HS-DPCCH scheduled period CQI_C after the end of the UL transmission gap interval. DTX (Discontinuous Transmission) is stored in the CQI field instead of a CQI in scheduled periods in the UL transmission gap interval.

Next, an example of the timing relationship between a DL transmission gap interval, measurement reference periods, and a UL transmission gap interval in the case where feedback cycle k=4 in compressed mode is shown in FIG. 7. In FIG. 7, since feedback cycle k=4, the frequency of appearance of a scheduled period with respect to a measurement reference period is ¼. Therefore, in FIG. 7, instead of using measurement reference period Reference Periods_E partially overlapping the DL transmission gap interval, a CQI is generated based on the received signal of immediately preceding measurement reference period Reference Periods_B that does not overlap the DL transmission gap interval, and this generated CQI is transmitted from the mobile station to the base station in the first HS-DPCCH scheduled period CQI_E after the end of the UL transmission gap interval. With regard to these points the situation in FIG. 7 is similar to that in FIG. 6, but in FIG. 7, as feedback cycle k=4, a CQI is generated based on the measurement reference period Reference Periods_B received signal which should not really be used for CQI generation, and moreover a CQI is specially generated based on the measurement reference period Reference Periods_F immediately after measurement reference period Reference Periods_E, and this CQI is transmitted from the mobile station to the base station in postulated period CQI_H, which is not a scheduled period. A CQI transmitted from the mobile station to the base station in postulated period CQI_F which is not a scheduled period in this way is called an extra CQI.

Timing relationships between a DL transmission gap interval, measurement reference periods, and a UL transmission gap interval as shown in FIG. 6 and FIG. 7 are described in Non-patent Document 1.

Non-patent Document 1: Title: "CQI reporting in DL Compressed Mode", Source: Philips, 3GPP TSG RAN WG1#33, Agenda Item: 5.3, Document No: Tdoc R1-030742, New York, USA, 25th-29th Aug. 2003

DISCLOSURE OF INVENTION

Problems to be Solved by the Invention

However, with a conventional compressed mode CQI transmission method as illustrated in FIG. 6 and FIG. 7, when a DL transmission gap interval and UL transmission gap interval appear at the same time, and there is a scheduled period immediately after the UL transmission gap interval, a CQI based on the received signal cannot be generated since a measurement reference period corresponding to that scheduled period overlaps the DL gap, and therefore a CQI generated based on the received signal of the measurement reference period that ends immediately before that DL transmission gap interval begins is transmitted from the mobile station to the base station. Consequently, considering that propagation path conditions vary continually and dynamically, the first CQI transmitted after this DL transmission gap interval and UL transmission gap interval end will scarcely reflect the propagation path conditions at the time of transmission, and even if transmitted from the mobile station to the base station, will probably be of little practical value to the base station.

Another problem with the conventional compressed mode CQI transmission method is that, since a CQI based on the received signal of a measurement reference period that ends immediately before a DL transmission gap interval begins must be continually maintained until being transmitted in the first postulated period after the UL transmission gap interval ends, the configuration of an apparatus for implementing this CQI transmission method, and control of the component parts of such an apparatus, are extremely complicated.

A further problem with the conventional compressed mode CQI transmission method is that, if the value of feedback cycle k is 2 or more, this does not correspond to a scheduled period, and therefore cases arise in which a CQI is generated based on the received signal of a measurement reference period that should not really be used for CQI generation, and especially when a DL transmission gap interval has begun, a CQI based on a measurement reference period preceding the beginning of that interval is generated, so that management of received signals for each measurement reference period and control of the process of CQI generation based on those received signals becomes complicated.

It is an object of the present invention to provide an outbound propagation path quality information transmitting method that enables a mobile station to maintain reception performance virtually equal to that of a conventional compressed mode outbound propagation path quality information transmitting method, and in which control relating to received signal measurement necessary for generating outbound propagation path quality information and so forth transmitted on a UL is simple, together with a CQI transmitting apparatus that is capable of implementing this outbound propagation path quality information transmitting method and that has a simple configuration.

Means for Solving the Problem

A compressed mode outbound propagation path quality information transmitting method according to the present invention includes: a receiving step of receiving a radio signal; an outbound propagation path quality information generating step of generating outbound propagation path quality information for each measurement reference period based on a received signal; an extracting step of extracting control parameters from the received signal; a timing generating step of calculating a downlink transmission gap interval and uplink transmission gap interval based on the extracted control parameters, and generating timing for transmitting the outbound propagation path quality information when a postulated period for which transmission is assumed of the outbound propagation path quality information generated based on the received signal of a measurement reference period not overlapping the calculated downlink transmission gap interval, and a postulated period not overlapping the uplink transmission gap interval, first match after the downlink transmission gap interval and uplink transmission gap interval have both ended; and a transmitting step of transmitting, at the timing generated in the timing generating step, the outbound propagation path quality information generated based on the received signal of the measurement reference period not overlapping the downlink transmission gap interval and after the downlink transmission gap interval has ended.

An outbound propagation path quality information transmitting apparatus according to the present invention includes: a receiving section that receives a radio signal; an outbound propagation path quality information generation section that generates outbound propagation path quality information for each measurement reference period based on a received signal received by the receiving section; an extraction section that extracts control parameters from the received signal; a timing generation section that calculates a downlink transmission gap interval and uplink transmission gap interval based on the extracted control parameters, and generates timing for transmitting the outbound propagation path quality information when a postulated period for which transmission is assumed of the outbound propagation path quality information generated based on the received signal of a measurement reference period not overlapping the calculated downlink transmission gap interval, and a postulated period not overlapping the uplink transmission gap interval, first match after the downlink transmission gap interval and uplink transmission gap interval have both ended; and a transmitting section that transmits, at the timing generated by the timing generation section, the outbound propagation path quality information generated based on the received signal of the measurement reference period not overlapping the downlink transmission gap interval and after the downlink transmission gap interval has ended.

Advantageous Effect of the Invention

The present invention enables a mobile station to maintain reception performance virtually equal to that of a conventional compressed mode outbound propagation path quality information transmitting method, and enables operation control of each component part of a mobile station relating to received signal measurement necessary for generating outbound propagation path quality information and so forth transmitted on a UL to be performed easily.

BEST MODE FOR CARRYING OUT THE INVENTION

The gist of the present invention is that, in a case in which packet data that is transmitted on a DL in a compressed mode in which DL and UL transmission gap intervals appear—that is, discontinuously—is received, outbound propagation path quality information generated based on a received signal before that DL transmission gap interval begins is not transmitted by a mobile station to a base station after that DL transmission gap interval and UL transmission gap interval have both ended.

In other words, the gist of the present invention is that, in a compressed mode in which DL and UL transmission gap intervals appear, a CQI generated based on a received signal before that DL transmission gap interval begins is discarded after that DL transmission gap interval begins.

Embodiments of the present invention will now be described in detail with reference to the accompanying drawings.

Embodiment 1

Figure 8:
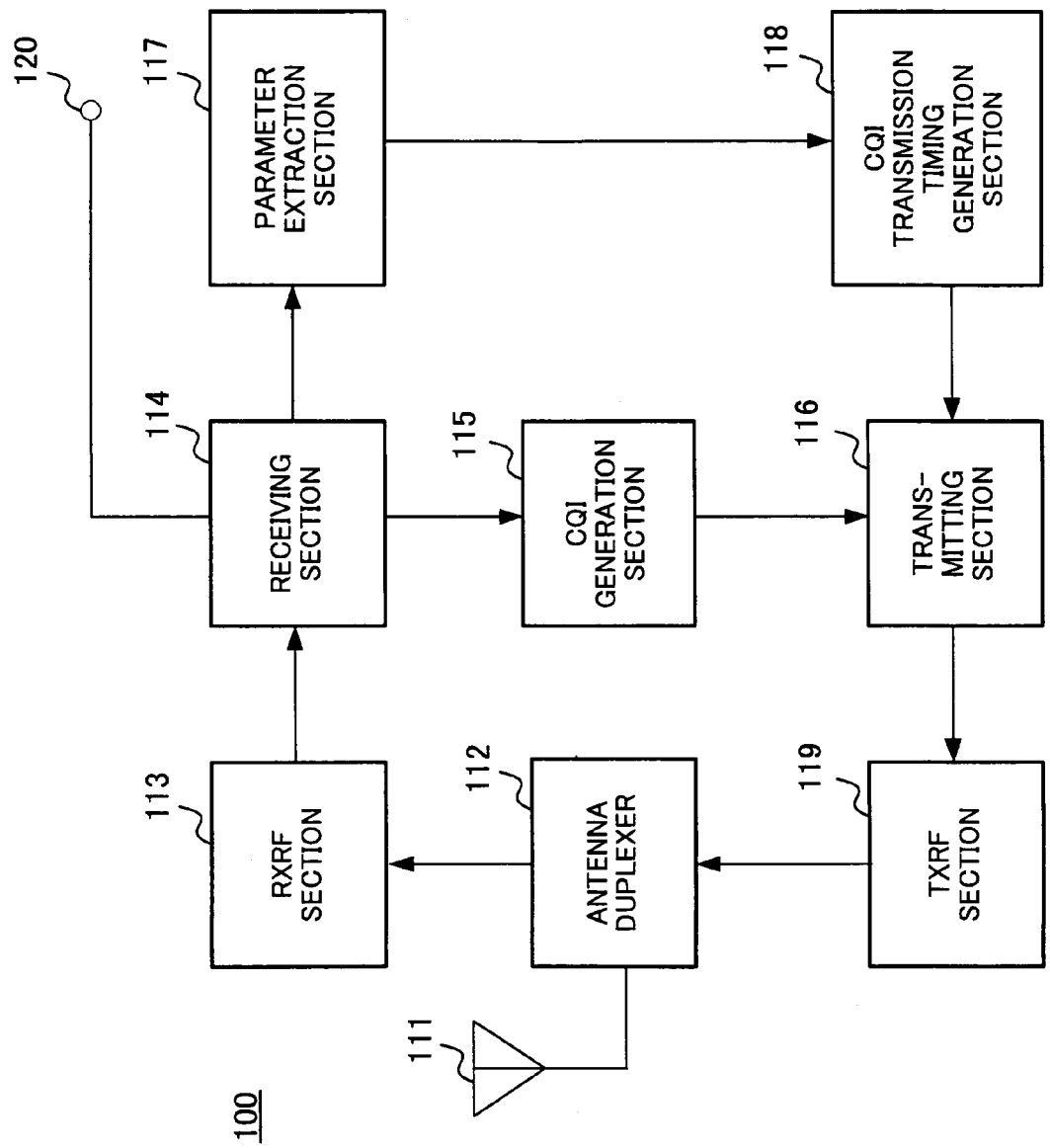
FIG. 8 is a block diagram showing the configuration of a CQI transmitting apparatus according to an embodiment of the present invention.

FIG. 8 shows the configuration of a CQI transmitting apparatus 100 according to Embodiment 1 of the present invention. CQI transmitting apparatus 100 is used incorporated in a mobile station that performs HSDPA compressed mode communication.

CQI transmitting apparatus 100 is equipped with an antenna element 111, an antenna duplexer 112, an RxRF section 113, a receiving section 114, a CQI generation section 115, a transmitting section 116, a parameter extraction section 117, a CQI transmission timing generation section 118, a TxRF section 119, and a data output terminal 120.

Antenna element 111 picks up CPICH, HS-SCCH, HS-PDSCH, and suchlike radio signals of various frequency bands transmitted from the base station of the cell to which the mobile station currently belongs and base stations of other cells, and inputs picked up signals to antenna duplexer 112. Antenna element 111 also transmits an HS-DPCCH transmit signal input from antenna duplexer 112 to a base station.

Antenna duplexer 112 inputs a received signal input from antenna element 111 to RxRF section 113, and also inputs a transmit signal input from TxRF section 119 to antenna element 111.

RxRF section 113 is equipped with a public domain bandpass filter, low-noise amplifier, and so forth, performs CPICH, HS-SCCH, and HS-PDSCH separation on a channel-by-channel basis for a received signal input from antenna duplexer 112, amplifies the separated individual channel received signals and inputs the amplified signals to receiving section 114.

Receiving section 114 executes demodulation processing on the respective channel received signals input from RxRF section 113, then inputs a CPICH received signal to CQI generation section 115, an HS-SCCH received signal to parameter extraction section 117, and an HS-PDSCH received signal to a base band section (not shown) via data output terminal 120.

Based on the CPICH received signal input from receiving section 114, CQI generation section 115 calculates the SNR for each measurement reference period by a public domain means, and generates CQI bits based on the calculated SNR. Calculated CQIs are input to transmitting section 116 sequentially for each measurement reference period.

Transmitting section 116 is equipped with a band-pass filter, modulator, registers, and so forth, temporarily holds a CQI input from CQI generation section 115 in an internal register, stores the CQI held in this register in the CQI field of the HS-DPCCH in accordance with timing provided by CQI transmission timing generation section 118, and then executes modulation processing on this HS-DPCCH transmit signal and inputs the resulting signal to TxRF section 119. When timing is provided by CQI transmission timing generation section 118 in this way, transmitting section 116 stores the CQI held in the internal register in the CQI field of the HS-DPCCH in accordance with this timing, and performs modulation, followed by input to TxRF section 119. On the other hand, when timing is not provided by CQI transmission timing generation section 118 even though an HS-DPCCH postulated period has arrived, transmitting section 116 stores DTX in this CQI field, and performs modulation, followed by input to TxRF section 119. Also, when a CQI input from CQI generation section 115 is stored in the HS-DPCCH CQI field in the next postulated period to arrive, transmitting section 116 discards the CQI simultaneously with this storage, and even when the CQI is not stored in that CQI field, since that CQI will not be used subsequently, discards the CQI by overwriting the register when the next CQI is input from CQI generation section 115.

Parameter extraction section 117 extracts control parameters indicating information such as the channelization code, degree of multiplexing, and modulation method necessary for identifying the compressed mode situation or for generating the timing for CQI transmission from the HS-SCCH received signal input from receiving section 114, and inputs the extracted control parameters to CQI transmission timing generation section 118.

CQI transmission timing generation section 118 acquires information such as the start and end times of a DL transmission gap interval and UL transmission gap interval and the value of feedback cycle k in compressed mode based on the control parameters input from parameter extraction section 117. CQI transmission timing generation section 118 also generates the timing for first transmitting a CQI generated based on the received signal of the measurement reference period that begins after the DL transmission gap interval ends after the DL transmission gap interval and UL transmission gap interval have ended, and provides this timing to transmitting section 116.

TxRF section 119 is equipped with a band-pass filter, low-noise amplifier, frequency converter, and so forth, executes predetermined signal processing such as frequency conversion and amplification on an HS-DPCCH transmit signal input from secondary transfer roller 16, and inputs the resulting signal to antenna duplexer 112.

Figure 9:
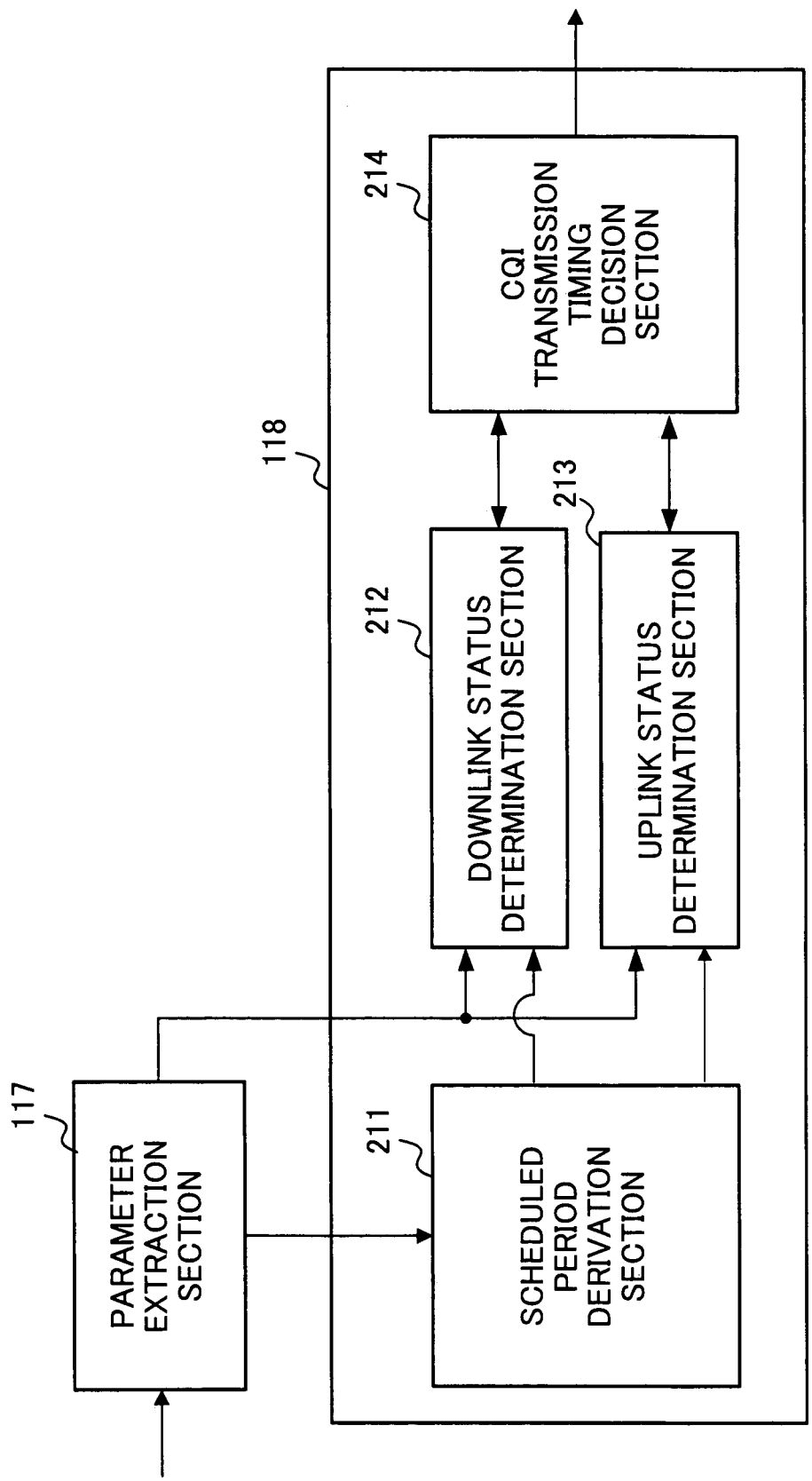
FIG. 9 is a block diagram showing the configuration of a CQI transmitting apparatus according to an embodiment of the present invention.

FIG. 9 shows the configuration of CQI transmission timing generation section 118 in CQI transmitting apparatus 100 according to this embodiment. CQI transmission timing generation section 118 is equipped with a scheduled period derivation section 211, a DL status determination section 212, a UL status determination section 213, and a CQI transmission timing decision section 214.

Scheduled period derivation section 211 identifies the value of feedback cycle k for the UL on which communication is in progress based on control parameters input from parameter extraction section 117, and inputs a signal indicating scheduled period arrival to DL status determination section 212 and UL status determination section 213 at a cycle in accordance with this feedback cycle k value.

When a scheduled period notification signal is input from scheduled period derivation section 211, DL status determination section 212 performs the following operations. DL status determination section 212 calculates a DL transmission gap interval based on control parameters input from parameter extraction section 117, and by comparing the calculated DL transmission gap interval information with the scheduled period notification signal from scheduled period derivation section 211, determines whether the measurement reference period corresponding to that scheduled period does not overlap the DL transmission gap interval. That is to say, DL status determination section 212 determines whether or not the CQI generated by CQI generation section 115 at almost the same time as this comparison operation and held in transmitting section 116 is a CQI generated based on a received signal of a measurement reference period that does not overlap the DL transmission gap interval. If the result of this determination is affirmative that is, if DL status determination section 212 determines that the CQI held in transmitting section 116 is a CQI generated based on a received signal of a measurement reference period that does not overlap the DL transmission gap interval—DL status determination section 212 inputs a signal reporting that the determination result is affirmative to CQI transmission timing decision section 214. On the other hand, if the result of this determination is negative—that is, if DL status determination section 212 determines that the CQI held in transmitting section 116 is a CQI generated based on a received signal of a measurement reference period that overlaps the DL transmission gap interval—DL status determination section 212 notifies CQI transmission timing decision section 214 that the determination result is negative, and then performs the same kind of operation until it is determined that the CQI was generated based on a received signal of a measurement reference period that does not overlap the DL transmission gap interval. That is to say, once DL status determination section 212 makes a negative determination, it determines whether the measurement reference period corresponding to the next scheduled period (postulated period when feedback cycle k is 2 or more) does not overlap the DL transmission gap interval, and repeats the determination procedure until an affirmative determination result is obtained. Then, in the scheduled period or postulated period corresponding to the measurement reference period for which that affirmative determination result was obtained, DL status determination section 212 inputs a signal reporting that the determination result is affirmative to CQI transmission timing decision section 214. Normally, DL status determination section 212 does not perform the above-described series of operations until a scheduled period notification signal is input from scheduled period derivation section 211, but when a determination request signal is input from CQI transmission timing decision section 214, determines whether the next measurement reference period to arrive does not overlap the DL transmission gap interval. The determination request signal input from CQI transmission timing decision section 214 will be described later herein.

When a scheduled period notification signal is input from scheduled period derivation section 211, UL status determination section 213 performs the following operations. UL status determination section 213 calculates a UL transmission gap interval based on control parameters input from parameter extraction section 117, and determines whether the calculated UL transmission gap interval and the next scheduled period to arrive do not overlap. If the result of this determination is affirmative—that is, if UL status determination section 213 determines that the UL transmission gap interval and the next scheduled period to arrive do not overlap—UL status determination section 213 inputs a signal reporting that the determination result is affirmative to CQI transmission timing decision section 214. On the other hand, if the result of this determination is negative—that is, if UL status determination section 213 determines that the UL transmission gap interval and the next scheduled period to arrive overlap—UL status determination section 213 notifies CQI transmission timing decision section 214 that the determination result is negative, and performs the same kind of operation until it is determined that the scheduled period does not overlap the UL transmission gap interval. That is to say, once UL status determination section 213 makes a negative determination, it determines whether the next scheduled period (postulated period when feedback cycle k is 2 or more) does not overlap the UL transmission gap interval, and repeats the determination procedure until an affirmative determination result is obtained. Then, in the scheduled period or postulated period for which that affirmative determination result was obtained, UL status determination section 213 inputs a signal reporting that the determination result is affirmative to CQI transmission timing decision section 214. Normally, UL status determination section 213 does not perform the above-described series of operations until a scheduled period notification signal is input from scheduled period derivation section 211, but when a determination request signal is input from CQI transmission timing decision section 214, determines whether the next postulated period to arrive does not overlap the UL transmission gap interval. The determination request signal input from CQI transmission timing decision section 214 will be described later herein.

Only when the results of determination by DL status determination section 212 and determination by UL status determination section 213 are both affirmative—that is, when signals reporting an affirmative result are input from both DL status determination section 212 and UL status determination section 213—CQI transmission timing decision section 214 makes a decision to generate timing for transmitting the CQI held in transmitting section 116, and also provides this generated timing to transmitting section 116. When a signal reporting that the determination result is negative is input from DL status determination section 212 or UL status determination section 213, CQI transmission timing decision section 214 simultaneously inputs a determination request signal to DL status determination section 212 and UL status determination section 213 requesting DL status determination section 212 to determine whether the next measurement reference period overlaps the DL transmission gap interval and input the determination result, and similarly requesting UL status determination section 213 to determine whether the next postulated period overlaps the UL transmission gap interval and input the determination result. When feedback cycle k is 2 or more, this determination request signal is input repeatedly to DL status determination section 212 and UL status determination section 213 until an extra CQI is transmitted.

Figure 10:
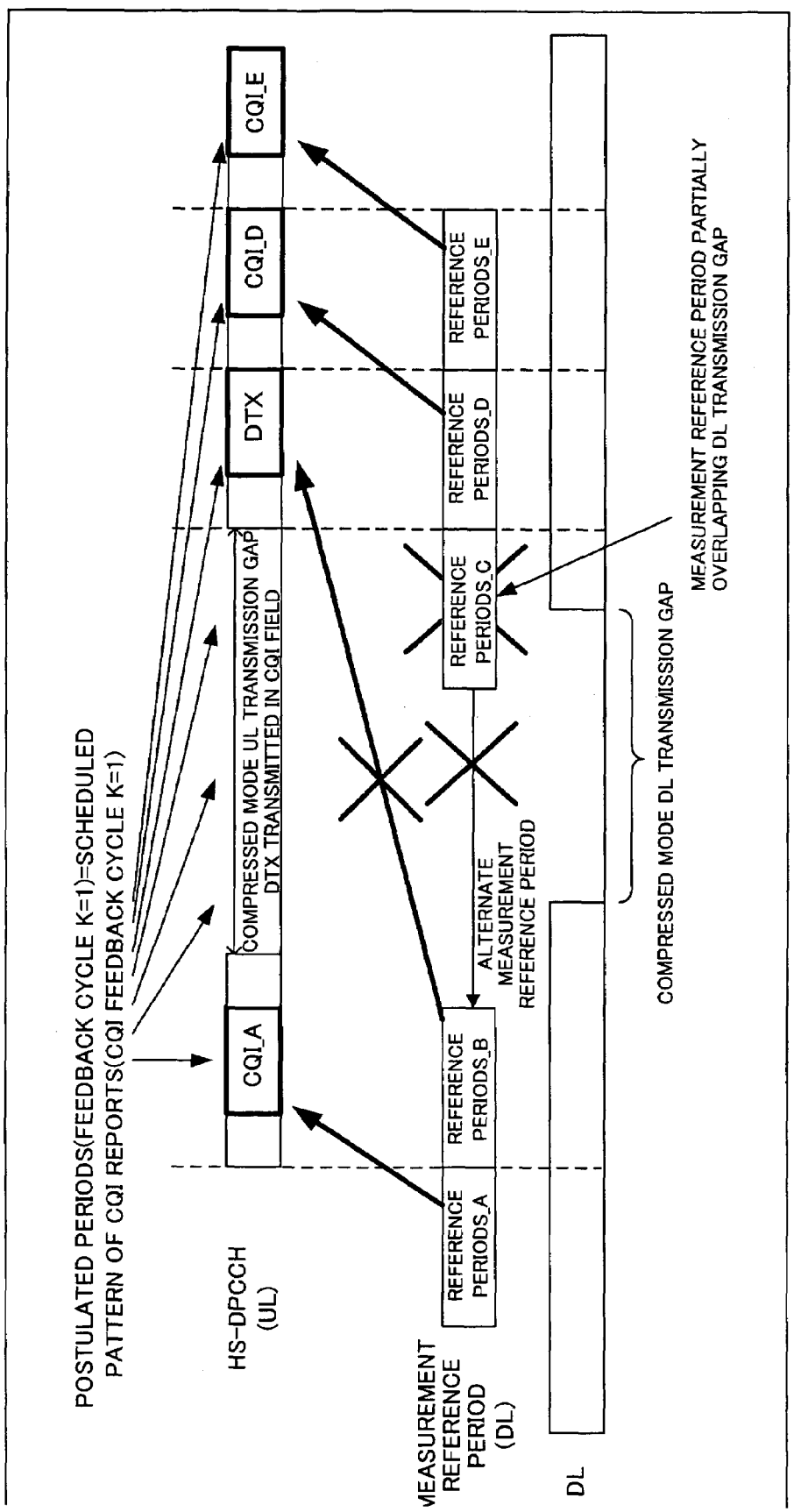
FIG. 10 is a timing chart showing an overview of a compressed mode CQI transmission method according to Embodiment 1.

Next, the operation of a CQI transmitting apparatus according to this embodiment will be described in detail together with the mode of implementation of a compressed mode CQI transmission method according to this embodiment. FIG. 10 shows an overview of a CQI transmission method according to this embodiment corresponding to FIG. 6. In this embodiment, it is assumed that feedback cycle k=1 according to compressed mode.

In the CQI transmission method according to this embodiment shown in FIG. 10, part of measurement reference period Reference Periods_C overlaps the DL transmission gap interval, and therefore a CQI generated based on the measurement reference period Reference Periods_C received signal cannot be stored in CQI field CQI_C in the HS-DPCCH and transmitted to the base station. In the case of the conventional compressed mode CQI transmission method shown in FIG. 6, a CQI generated based on the received signal of measurement reference period Reference Periods_B that ends just before the DL transmission gap interval begins can be stored in CQI field CQI_C in the HS-DPCCH and transmitted to the base station, but with CQI transmitting apparatus 100 according to this embodiment, a CQI generated based on the measurement reference period Reference Periods_B received signal by CQI generation section 115 is automatically discarded by transmitting section 116 after the DL transmission gap interval begins, and therefore this CQI cannot be stored in CQI field CQI_C and transmitted to the base station. Thus, in the CQI transmission method according to this embodiment, DTX is stored in the CQI field of the postulated period corresponding to CQI field CQI_C in FIG. 6 and transmitted to the base station by transmitting section 116. Therefore, in the CQI transmission method according to this embodiment, the CQI first transmitted after a DL transmission gap interval ends is a CQI generated based on the measurement reference period Reference Periods_D received signal.

Figure 6:
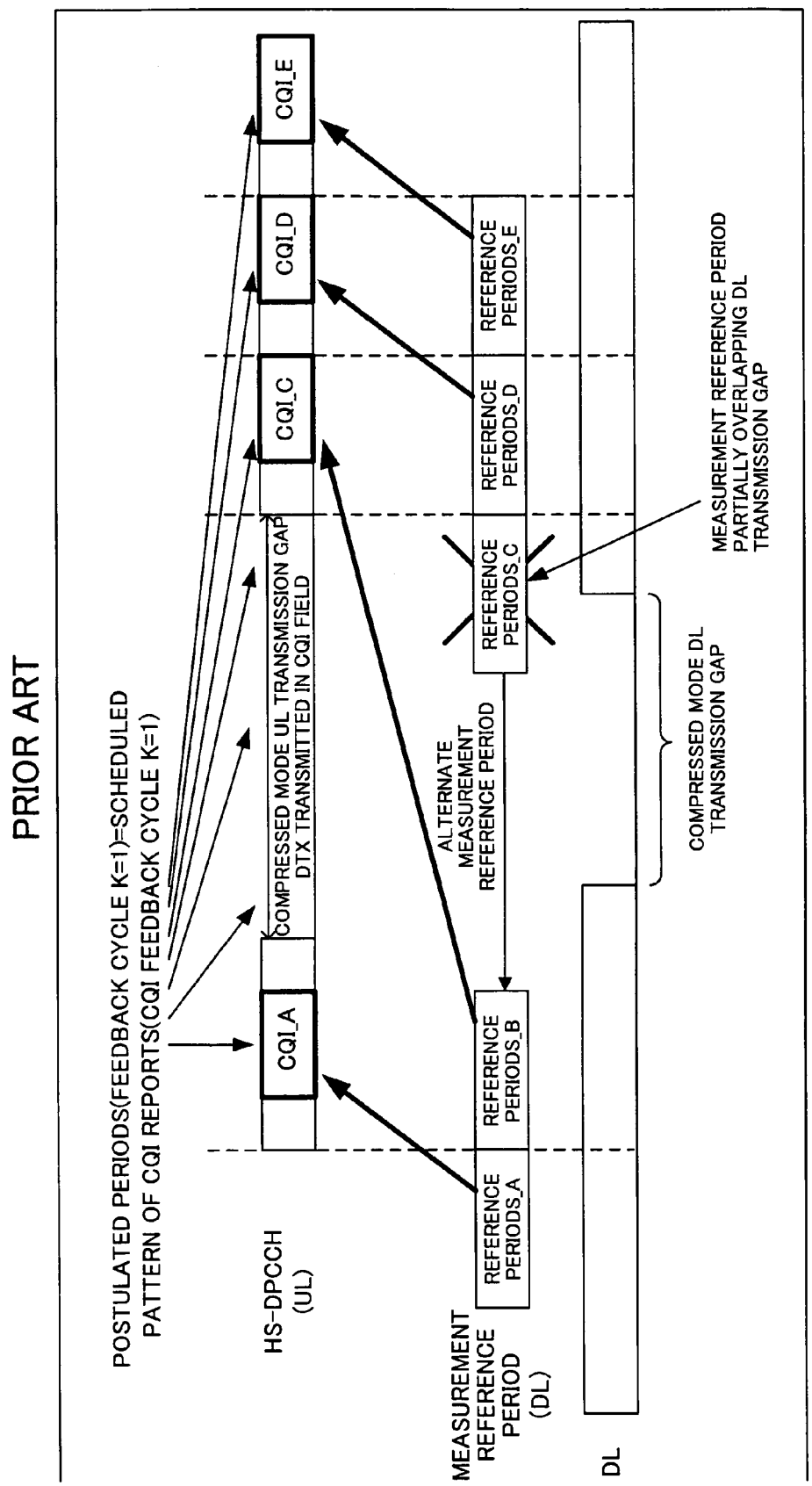
FIG. 6 is a timing chart showing an overview of the conventional compressed mode CQI transmission method.

Thus, in the CQI transmission method according to this embodiment, a CQI is not transmitted from a mobile station to a base station from the time when a DL transmission gap interval begins until CQI field CQI_D arrives, whereas in the conventional CQI transmission method shown in FIG. 6, the CQI transmitted in CQI field CQI_C is essentially of low practical value, and therefore the CQI transmission method according to this embodiment does not significantly lower the reception performance of a mobile station as compared with the conventional CQI transmission method.

Next, the operation of each component part provided in CQI transmission timing generation section 118 will be described in concrete terms for the compressed mode CQI transmission method according to this embodiment. Both DL status determination section 212 and UL status determination section 213 identify in advance the beginning and ending of a DL transmission gap interval and UL transmission gap interval as illustrated in FIG. 10 based on control parameters input from parameter extraction section 117. Also, DL status determination section 212 pre-identifies by means of calculation a DL CPICH subframe that even partially overlaps a DL transmission gap interval, and similarly, UL status determination section 213 pre-identifies by means of calculation a UL HS-DPCCH subframe or scheduled period that even partially overlaps a UL transmission gap interval.

At an arbitrary time within measurement reference period Reference Periods_A shown in FIG. 10, scheduled period derivation section 211 determines whether CQI field CQI_A in the UL HS-DPCCH corresponds to a scheduled period, and if CQI field CQI_A corresponds to a scheduled period, inputs to DL status determination section 212 and UL status determination section 213 a signal indicating that CQI field CQI_A arriving next corresponds to a scheduled period. In this embodiment, since feedback cycle k=1, all CQI fields arriving from CQI field CQI_A onward correspond to scheduled periods.

At an arbitrary time within measurement reference period Reference Periods_A shown in FIG. 10, if a signal indicating that CQI field CQI_A arriving next corresponds to a scheduled period has been input to UL status determination section 213 from scheduled period derivation section 211, UL status determination section 213 determines whether not even part of CQI field CQI_A arriving next overlaps the UL transmission gap interval, and if the determination result is affirmative—that is, if it is determined that the UL transmission gap interval and CQI field CQI_A arriving next do not overlap—inputs a signal reporting that the determination result is affirmative to CQI transmission timing decision section 214. Thus scheduled period derivation section 211 and UL status determination section 213 determine in any measurement reference period whether a CQI can be transmitted in the CQI field in the next subframe of that measurement reference period.

On the other hand, at an arbitrary time within measurement reference period Reference Periods_A shown in FIG. 10, DL status determination section 212 determines whether not even part of measurement reference period Reference Periods_A overlaps the DL transmission gap interval, and if the determination result is affirmative that is, if it is determined that measurement reference period Reference Periods_A does not overlap the DL transmission gap interval—inputs a signal reporting that the determination result is affirmative to CQI transmission timing decision section 214. Thus DL status determination section 212 determines at any time within a particular measurement reference period whether a CQI generated based on the received signal of that measurement reference period accurately reflects the propagation path conditions.

Regarding measurement reference period Reference Periods_A shown in FIG. 10, since CQI field CQI_A does not overlap the UL transmission gap interval, UL status determination section 213 determines that it is possible to transmit a CQI in CQI field CQI_A, and inputs this affirmative determination result to CQI transmission timing decision section 214. Also, regarding measurement reference period Reference Periods_A shown in FIG. 10, since measurement reference period Reference Periods_A does not overlap the DL transmission gap interval, DL status determination section 212 determines that a CQI generated based on the measurement reference period Reference Periods_A received signal is a usable CQI that adequately reflects the propagation path conditions, and inputs this affirmative determination result to CQI transmission timing decision section 214. Therefore, for measurement reference period Reference Periods_A shown in FIG. 10, since affirmative determination results are input to CQI transmission timing decision section 214 from both DL status determination section 212 and UL status determination section 213, CQI transmission timing decision section 214 makes a decision to generate timing for transmitting the CQI generated based on the measurement reference period Reference Periods_A received signal held in transmitting section 116, and also provides this generated timing to transmitting section 116. Transmitting section 116 then stores the held CQI in UL CQI field CQI_A and transmits it to the base station in accordance with the timing provided by CQI transmission timing decision section 214.

Next, regarding measurement reference period Reference Periods_B shown in FIG. 10, since CQI field CQI_B overlaps the UL transmission gap interval (CQI field CQI_B is not shown in the figure), UL status determination section 213 determines that a CQI cannot be transmitted in CQI field CQI_B. UL status determination section 213 therefore inputs a signal indicating that the determination result is negative for this measurement reference period Reference Periods_B to CQI transmission timing decision section 214. Consequently, since a signal indicating that the determination result is affirmative is not input from UL status determination section 213 to CQI transmission timing decision section 214 for measurement reference period Reference Periods_B shown in FIG. 10, CQI transmission timing decision section 214 cannot make a decision to generate timing for transmitting a CQI generated based on the measurement reference period Reference Periods_B received signal held in transmitting section 116. For measurement reference period Reference Periods_B shown in FIG. 10, therefore, since timing is not provided from CQI transmission timing decision section 214, transmitting section 116 stores DTX in CQI field CQI_B of the UL HS-DPCCH and transmits this to the base station.

Next, regarding measurement reference period Reference Periods_C shown in FIG. 10, since part of CQI field CQI_C overlaps the DL transmission gap interval, DL status determination section 212 determines that a CQI generated based on the measurement reference period Reference Periods_C received signal cannot be used. DL status determination section 212 therefore inputs a signal indicating that the determination result is negative for this measurement reference period Reference Periods_C to CQI transmission timing decision section 214. Consequently, since a signal based on an affirmative determination result is not input from DL status determination section 212 to CQI transmission timing decision section 214 for measurement reference period Reference Periods_C shown in FIG. 10, CQI transmission timing decision section 214 cannot make a decision to generate timing for transmitting a CQI generated based on the measurement reference period Reference Periods_C received signal held in transmitting section 116. For measurement reference period Reference Periods_C shown in FIG. 10, therefore, since timing is not provided from CQI transmission timing decision section 214, transmitting section 116 stores DTX in CQI field CQI_C (see FIG. 6) and transmits this to the base station.

Next, regarding measurement reference period Reference Periods_D shown in FIG. 10, since CQI field CQI_D does not overlap the UL transmission gap interval, UL status determination section 213 determines that it is possible to transmit a CQI in CQI field CQI_D, and inputs this affirmative determination result to CQI transmission timing decision section 214. Also, regarding measurement reference period Reference Periods_D shown in FIG. 10, since measurement reference period Reference Periods_D does not overlap the DL transmission gap interval, DL status determination section 212 determines that a CQI generated based on the measurement reference period Reference Periods_D received signal is usable, and inputs this affirmative determination result to CQI transmission timing decision section 214. Therefore, for measurement reference period Reference Periods_D shown in FIG. 10, since affirmative determination results are input to CQI transmission timing decision section 214 from both DL status determination section 212 and UL status determination section 213, CQI transmission timing decision section 214 makes a decision to generate timing for transmitting the CQI generated based on the measurement reference period Reference Periods_D received signal held in transmitting section 116, and also provides this generated timing to transmitting section 116. Transmitting section 116 then transmits the CQI held in transmitting section 116 to the base station in UL CQI field CQI_D in accordance with the timing provided by CQI transmission timing decision section 214.

Thus, according to CQI transmitting apparatus 100 of this embodiment, only when timing for transmitting a CQI in accordance with compressed mode stipulations is necessary, that timing is generated by CQI transmission timing generation section 118, and when a DL transmission gap interval has begun, it is not longer necessary for CQI generation section 115 to generate a CQI based on the measurement reference period Reference Periods_B received signal backward from that beginning, and it is no longer necessary for transmitting section 116 to hold CQIs generated based on measurement reference period received signals up until that beginning from that beginning onward, and therefore it is no longer necessary for CQI generation section 115 to hold received signals of a plurality of measurement reference periods in preparation for retroactive CQI generation, and it becomes acceptable for transmitting section 116 to simply discard a CQI input on an individual measurement reference period basis from CQI generation section 115 if that CQI is not transmitted by the time the next CQI is input, as a result of which it is no longer necessary to provide registers and so forth for CQI generation section 115 to continuously hold a plurality of measurement reference period received signals or for transmitting section 116 to continuously hold a plurality of CQIs, enabling these component parts to be simplified, and operation control for these component parts to be performed easily.

Also, according to the compressed mode CQI transmission method of this embodiment, it is possible to prevent a CQI generated based on the received signal of measurement reference period Reference Periods_B that ends just before a DL transmission gap interval begins from being transmitted in scheduled period CQI_C after the DL transmission gap interval and UL transmission gap interval end, and therefore it is no longer necessary for a CQI generated based on the measurement reference period Reference Periods_B received signal to be held after the DL transmission gap interval begins, enabling CQIs generated sequentially for each measurement reference period to be managed easily. In addition, according to the compressed mode CQI transmission method of this embodiment, even if a CQI generated based on the measurement reference period Reference Periods_B received signal is discarded when the DL transmission gap interval begins, a CQI is not subsequently regenerated retroactively based on the measurement reference period Reference Periods_B received signal, as a result of which the management of CQIs generated sequentially for each measurement reference period is made significantly easier.

Furthermore, according to the compressed mode CQI transmission method of this embodiment, a CQI generated based on the received signal of measurement reference period Reference Periods_D that begins after the DL transmission gap interval has ended is transmitted from a mobile station to a base station in CQI field CQI_D, which is a scheduled period one subframe later than the time at which the DL transmission gap interval and UL transmission gap interval end, enabling the reception performance of a mobile station to be kept virtually equal to that of a conventional CQI transmission method.

Embodiment 2

Figure 7:
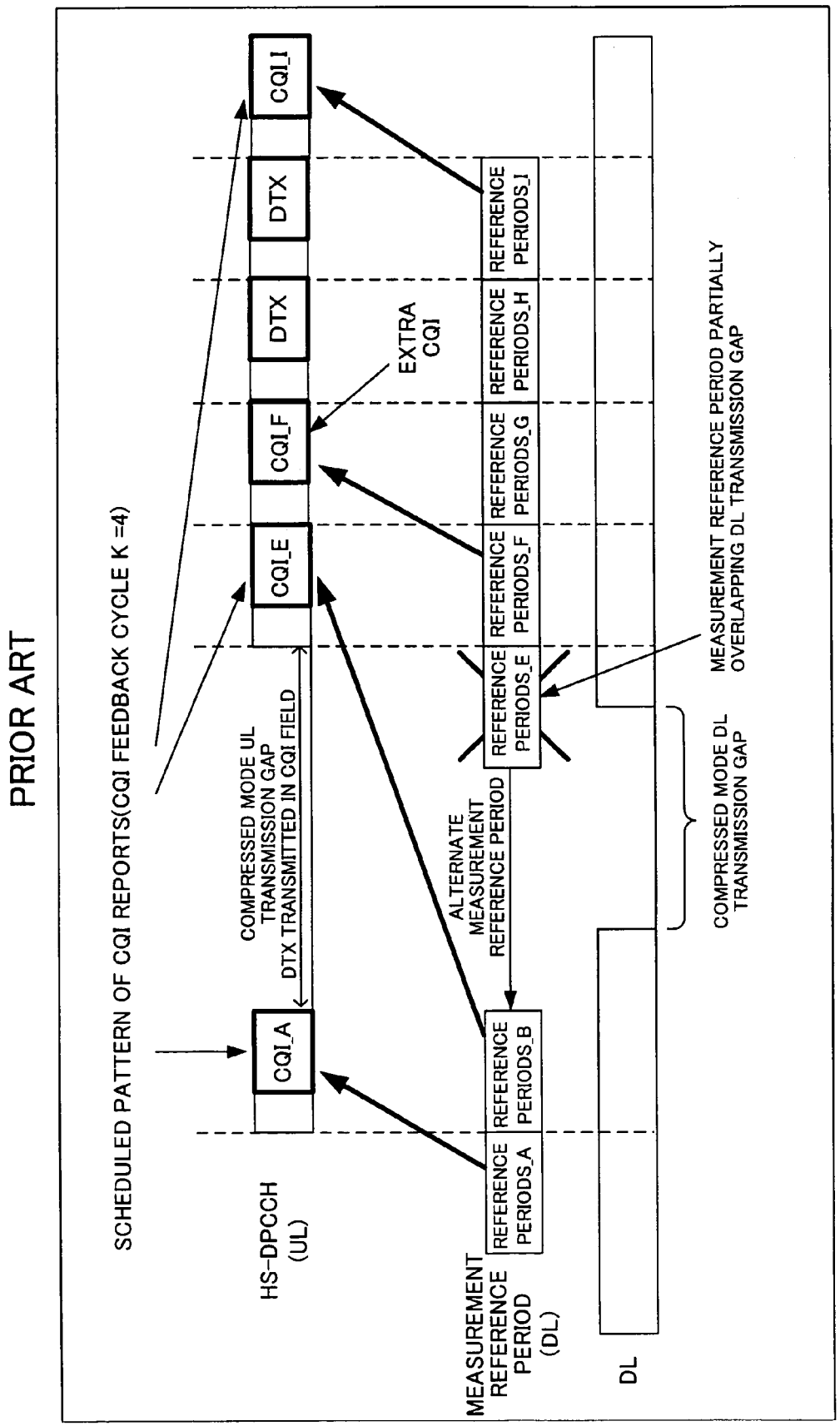
FIG. 7 is a timing chart showing an overview of the conventional compressed mode CQI transmission method.
Figure 11:
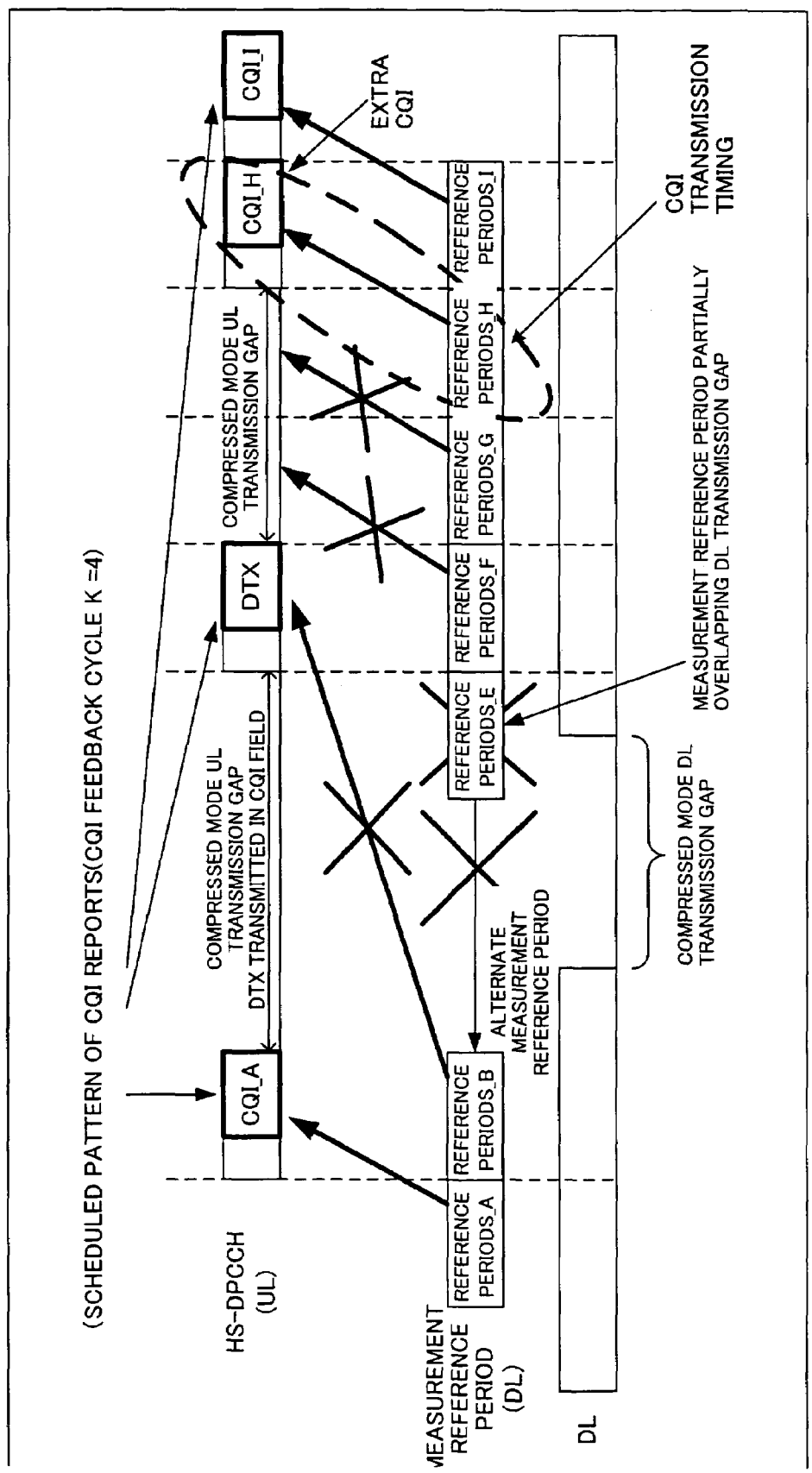
FIG. 11 is a timing chart showing an overview of a compressed mode CQI transmission method according to Embodiment 2.

FIG. 11 shows an overview of a compressed mode CQI transmission method according to Embodiment 2 of the present invention corresponding to FIG. 7. The CQI transmission method according to this embodiment differs from the compressed mode CQI transmission method according to Embodiment 1 in that the value of feedback cycle k has been changed from 1 to 4, and a new 2-subframe UL transmission gap interval has been added after the end of the UL transmission gap interval in the UL HS-DPCCH. A CQI transmitting apparatus according to this embodiment has the same configuration as CQI transmitting apparatus 100 used in Embodiment 1. Therefore, in order to avoid duplicated descriptions, in this embodiment only the points of difference from Embodiment 1 will be described in detail below.

In this embodiment, feedback cycle k=4, and therefore a scheduled period appears at a frequency of once every four postulated periods in the UL HS-DPCCH. To facilitate comparison with the CQI transmission method in Embodiment 1, in FIG. 11, in order for the postulated period immediately after the end of the UL transmission gap interval to become a scheduled period, this postulated period is taken to be CQI field CQI_E, and the measurement reference period corresponding thereto is taken to be Reference Periods_E. Therefore, the operation of CQI transmitting apparatus 100 up to CQI field CQI_E and measurement reference period Reference Periods_E shown in FIG. 11 is essentially identical to the operation of CQI transmitting apparatus 100 up to CQI field CQI_C and measurement reference period Reference Periods_C shown in FIG. 10.

Thus, in this embodiment, detailed descriptions will be given of the CQI transmission method and the operation of the component parts of CQI transmitting apparatus 100 in compressed mode for measurement reference period Reference Periods_F in FIG. 11 onward.

As shown in FIG. 11, measurement reference period Refernce Period_E corresponding to scheduled period CQI_E partially overlaps the DL transmission gap interval, and therefore DL status determination section 212 inputs a signal indicating that the determination result for measurement reference period Refernce Period_E is negative to CQI transmission timing decision section 214. Consequently, a determination request signal is input from CQI transmission timing decision section 214 to DL status determination section 212 and UL status determination section 213 from measurement reference period Refernce Period_F onward until an extra CQI is transmitted.

In response to a determination request signal input from CQI transmission timing decision section 214, DL status determination section 212 successively inputs signals indicating that the determination result is affirmative to CQI transmission timing decision section 214 for measurement reference period Reference Periods_F to measurement reference period Reference Periods_H.

On the other hand, in response to a determination request signal input from CQI transmission timing decision section 214 regarding measurement reference period Refernce Period_E, UL status determination section 213 first determines whether postulated period CQI field CQI_F corresponding to Refernce Period_F does not overlap a UL transmission gap interval. As can be seen from FIG. 11, CQI field CQI_F overlaps a UL transmission gap interval, and therefore UL status determination section 213 inputs a signal reporting that this determination result is negative to CQI transmission timing decision section 214. On receiving input of this signal, CQI transmission timing decision section 214 inputs a determination request signal to UL status determination section 213 in order to determine whether the next CQI field CQI_G does not overlap a UL transmission gap interval, and at the same time inputs a determination request signal to DL status determination section 212 in order to determine whether measurement reference period Refernce Period_G corresponding to CQI field CQI_G does not overlap a DL transmission gap interval. On receiving input of this determination request signal, UL status determination section 213 performs the same kind of determination as described above for CQI field CQI_G, and as can be seen from FIG. 11, also inputs a signal reporting that the determination result is negative for CQI field CQI_G to CQI transmission timing decision section 214. Then, on receiving input of this signal again, CQI transmission timing decision section 214 inputs a determination request signal to UL status determination section 213 to determine whether the next CQI field CQI_H does not overlap a UL transmission gap interval, and at the same time inputs a determination request signal to DL status determination section 212 to determine whether measurement reference period Refernce Period_H corresponding to CQI field CQI_H does not overlap the DL transmission gap interval. On receiving input of this determination request signal, UL status determination section 213 performs the same kind of determination as described above for postulated period CQI field CQI_H, and as can be seen from FIG. 11, inputs a signal reporting that the determination result is affirmative for CQI field CQI_H to CQI transmission timing decision section 214. At this time, also, a signal reporting that the determination result is affirmative for measurement reference period Refernce Period_H is input to CQI transmission timing decision section 214 from DL status determination section 212. Therefore, CQI transmission timing decision section 214 makes a decision to transmit an extra CQI in postulated period CQI field CQI_H, generates timing for reporting that decision, and provides the generated timing to transmitting section 116.

As timing is not provided to transmitting section 116 from CQI transmission timing generation section 118 for postulated periods CQI field CQI_F and CQI field CQI_G, transmitting section 116 transmits DTX stored in these CQI fields, and transmits CQI in the CQI field CQI_H.

Thus, according to the compressed mode CQI transmission method and CQI transmitting apparatus 100 of this embodiment, even when the value of feedback cycle k is 2 or more, and a new UL transmission gap interval is added after the end of the DL transmission gap interval and UL transmission gap interval, a CQI that adequately reflects the propagation path conditions is transmitted from a mobile station to a base station in postulated period CQI field CQI_H before the arrival of scheduled period CQI field CQI_I, making possible an early recovery from a decrease in mobile station reception performance that arises due to the appearance of a DL transmission gap interval or UL transmission gap interval in compressed mode.

In Embodiment 1 and Embodiment 2, a case has been described in which packet communication is performed by means of the HSDPA method in a W-CDMA system, but the present invention is not limited to this case, and can be applied to any communication system in which there is outbound propagation path quality information feedback on the UL, and there is a compressed mode.

The present application is based on Japanese Patent Application No. 2003-341719 filed on Sep. 30, 2003, the entire content of which is expressly incorporated by reference herein.

INDUSTRIAL APPLICABILITY

A compressed mode outbound propagation path quality information transmitting method and outbound propagation path quality information transmitting apparatus according to the present invention have the effects of enabling a mobile station to maintain reception performance virtually equal to that of a conventional compressed mode outbound propagation path quality information transmitting method, and enabling operation control and so forth of the component parts of a mobile station relating to received signal measurement necessary for generating outbound propagation path quality information transmitted on a UL and so forth to be performed easily, and are suitable for use in a mobile station or the like requiring an outbound propagation path quality information transmitting apparatus.

Figure 1:
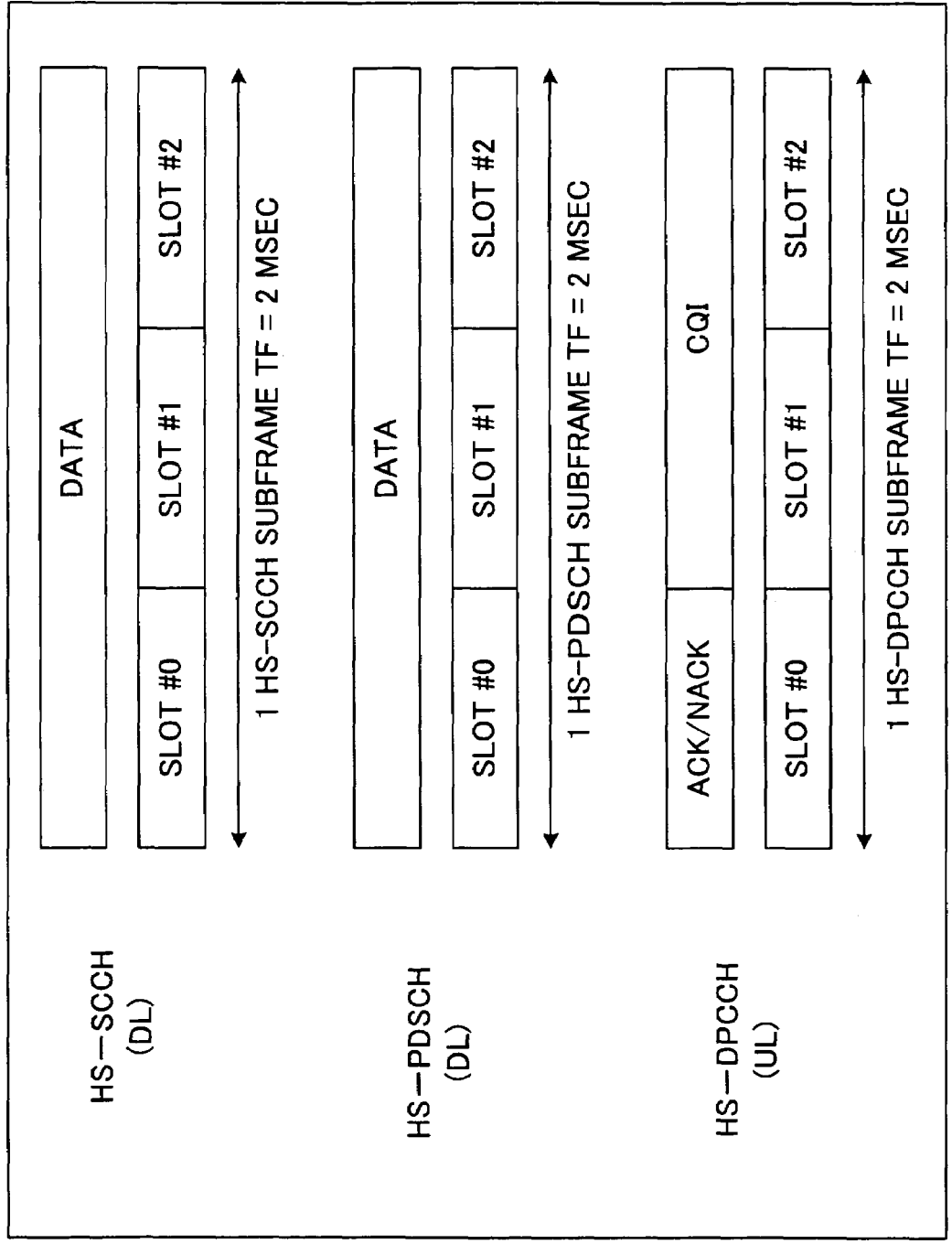
FIG. 1 is a drawing showing the frame formats of a plurality of channels in the HSDPA method.
Figure 2:
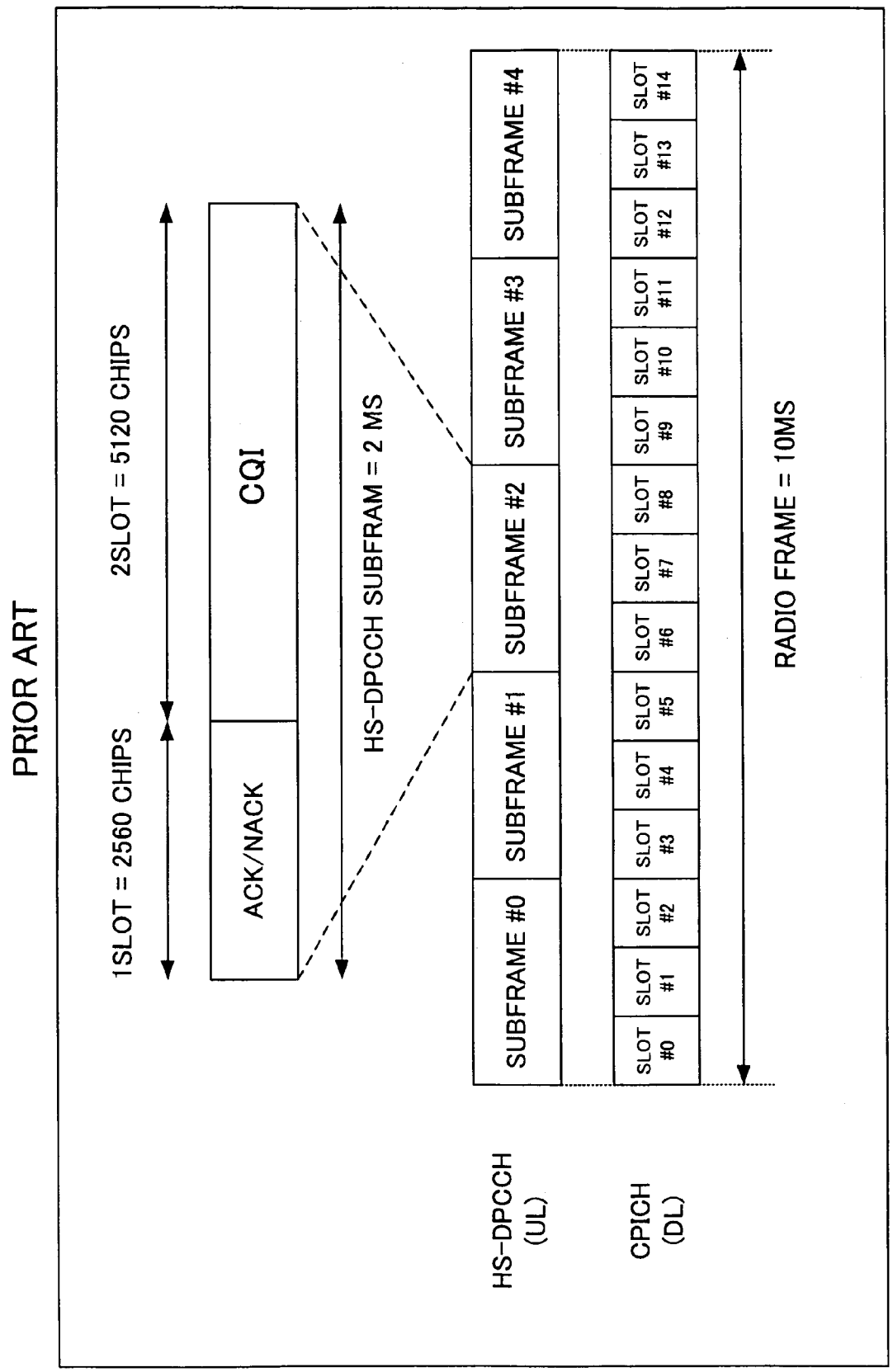
FIG. 2 is a drawing showing the HS-DPCCH frame format in the HSDPA method.
Figure 3:
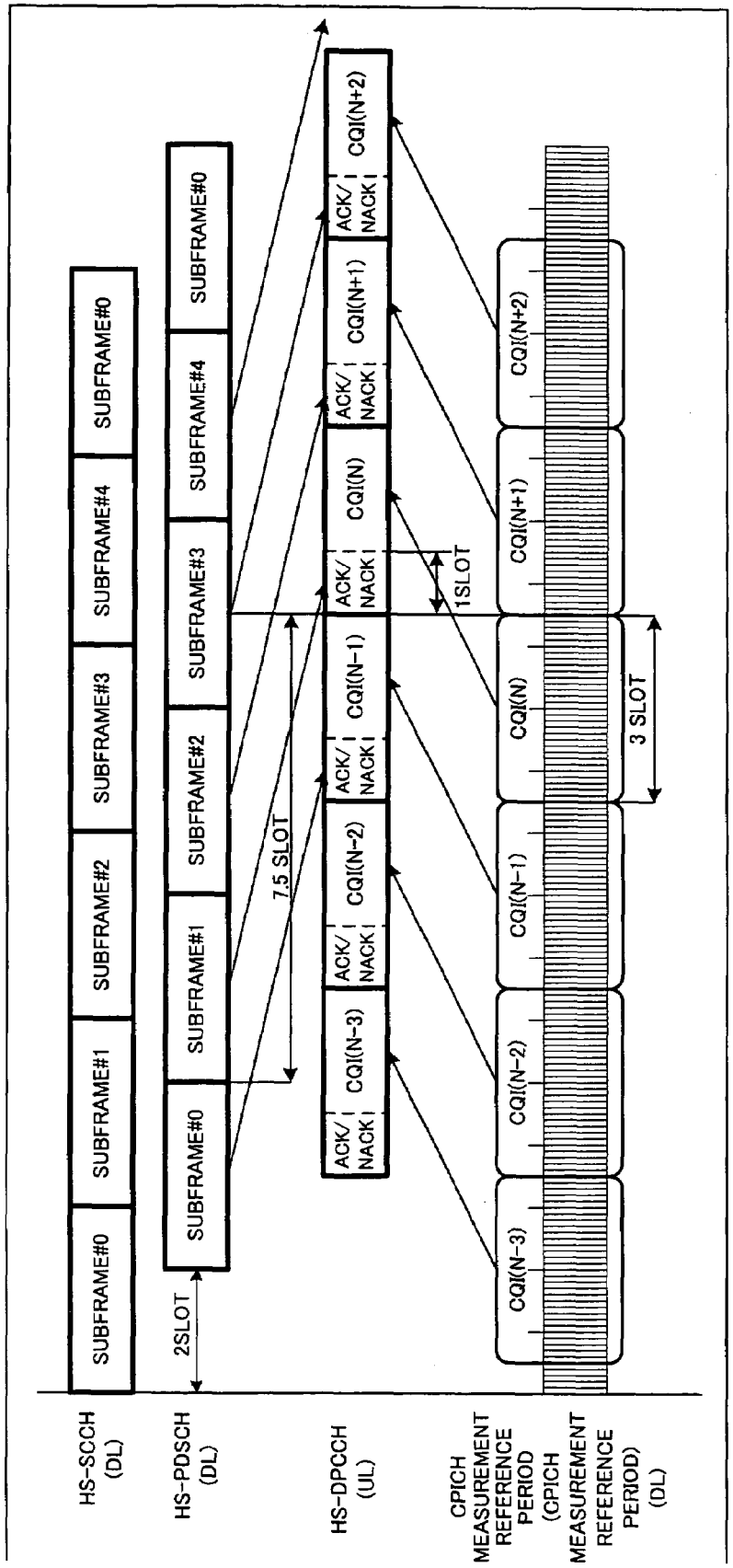
FIG. 3 is a timing chart showing the relationship between subframes of a plurality of channels in the HSDPA method.
Figure 4:
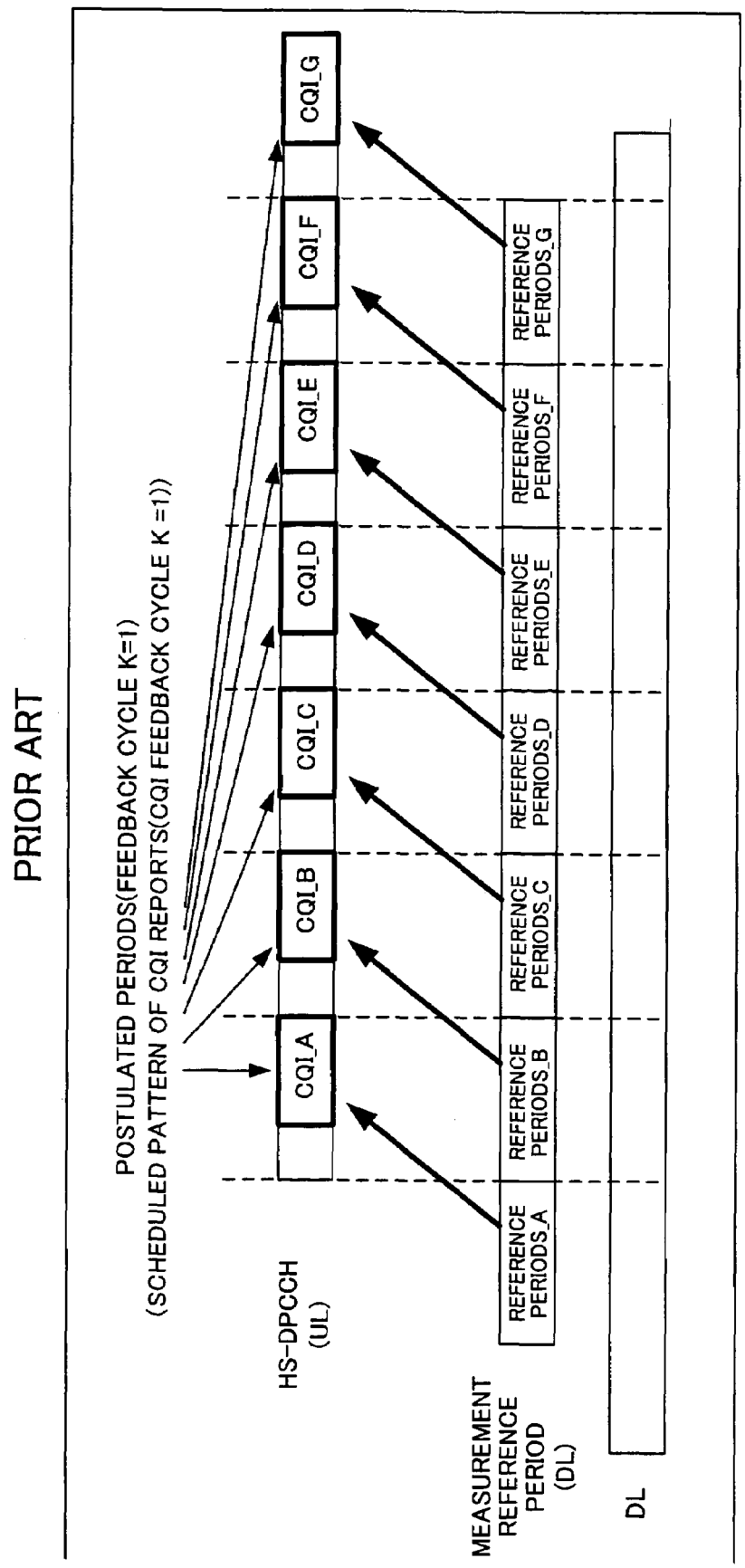
FIG. 4 is a timing chart showing an overview of the CQI transmission method in the conventional HSDPA method.
Figure 5:
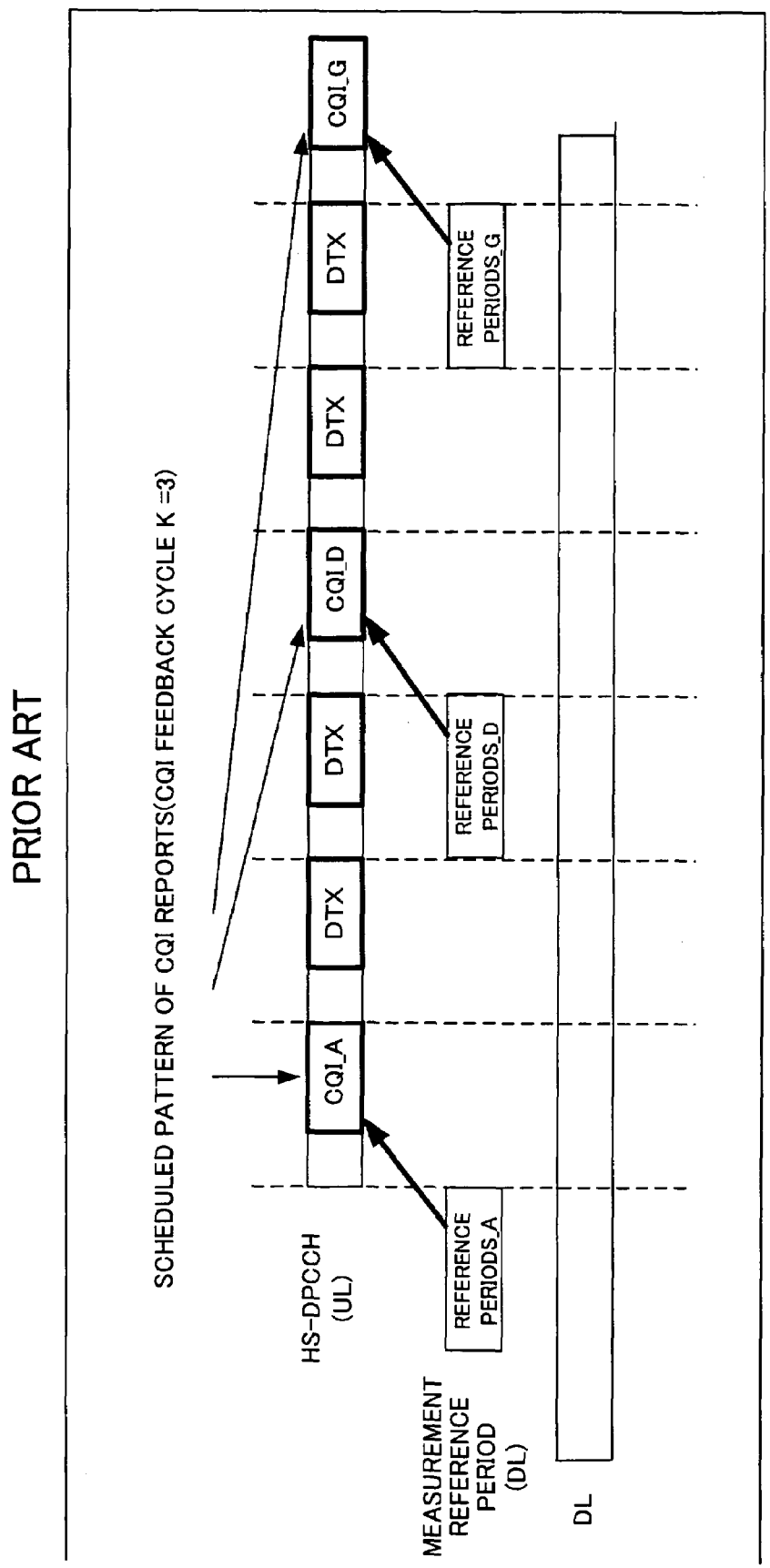
FIG. 5 is a timing chart showing an overview of the CQI transmission method in the conventional HSDPA method.

[FIG. 4]
Measurement Reference Period
[FIG. 5]
Measurement Reference Period
[FIG. 6]
Compressed mode UL transmission gap DTX transmitted in CQI field
Measured Reference Period
Alternate measurement reference period
Compressed mode DL transmission gap
Measurement reference period partially overlapping DL transmission gap
[FIG. 7]
Extra CQI
[FIG. 8]
112 ANTENNA DUPLEXER 113 RxRF SECTION 114 RECEIVING SECTION 115 CQI GENERATION SECTION 116 TRANSMITTING SECTION 117 PARAMETER EXTRACTION SECTION 118 CQI TRANSMISSION TIMING GENERATION SECTION 119 TxRF SECTION
[FIG. 9]
117 PARAMETER EXTRACTION SECTION 211 SCHEDULED PERIOD DERIVATION SECTION 212 DOWNLINK STATUS DETERMINATION SECTION 213 UPLINK STATUS DETERMINATION SECTION 214 CQI TRANSMISSION TIMING DECISION SECTION
[FIG. 11]
Compressed mode UL transmission gap
Extra CQI
CQI transmission timing

The invention claimed is:

1. A compressed mode downlink propagation path quality information transmitting method for normally transmitting downlink propagation path quality information in a scheduled period selected from an assumed period group in which transmission of the downlink propagation path quality information is assumed, the method comprising:

a receiving step of receiving a radio signal comprising a pilot channel signal and a downlink control channel signal;

a downlink propagation path quality information generating step of generating downlink propagation path quality information for each measurement reference period based on the pilot channel signal;

an extracting step of extracting a control parameter from the downlink control channel signal;

a timing generating step of: calculating a downlink transmission gap interval and an uplink transmission gap interval based on the extracted control parameter; given assumed periods which come after the downlink transmission gap interval has ended and which do not overlap the uplink transmission gap interval, determining sequentially whether a condition that a measurement reference period associated with the assumed period does not overlap the downlink transmission gap interval, is satisfied; and, in a first assumed period to satisfy the condition after the downlink transmission gap interval has ended, generating a timing for transmitting downlink propagation path quality information generated based on the pilot channel signal received in a measurement reference period associated with the first assumed period, as extra downlink propagation path quality information; and a transmitting step of transmitting the extra downlink propagation path quality information at the timing generated in the timing generating step.

2. The compressed mode downlink propagation path quality information transmitting method according to claim 1, wherein a radio signal received in the receiving step is a discontinuously transmitted packet data signal.

3. A downlink propagation path quality information transmitting apparatus that normally transmits downlink propagation path quality information in a scheduled period selected from an assumed period group in which transmission of the downlink propagation path quality information is assumed, the apparatus comprising:

a receiving section that receives a radio signal comprising a pilot channel signal and downlink control channel signal;

a downlink propagation path quality information generating section that generates downlink propagation path quality information for each measurement reference period based on the pilot channel signal;

an extraction section that extracts a control parameter from the downlink control channel signal;

a timing generation section: that calculates a downlink transmission gap interval and an uplink transmission gap interval based on the extracted control parameter; given assumed periods which come after the downlink transmission gap interval has ended and which do not overlap the uplink transmission gap interval, determines sequentially whether a condition that a measurement reference period associated with the assumed period does not overlap the downlink transmission gap interval, is satisfied; and, in a first assumed period to satisfy the condition after the downlink transmission gap interval has ended, generates a timing for transmitting downlink propagation path quality information generated based on the pilot channel signal received in a measurement reference period associated with the first assumed period, as extra downlink propagation path quality information; and a transmitting section that transmits the extra downlink propagation path quality information at the timing generated in the timing generation section.

4. The downlink propagation path quality information transmitting apparatus according to claim 3, wherein the timing generation section comprises:

an uplink status determination section that determines, in response to an input of a determination request signal, whether a next assumed period to affive satisfies a first condition of not overlapping the uplink transmission gap interval;

a downlink status determination section that determines, in response to the input of the determination request signal, whether a measurement reference gap interval associated with the next assumed period to affive satisfies a second condition of not overlapping the downlink transmission gap interval; and a decision section that decides to generate the timing for transmitting the extra downlink propagation path quality information when the first condition and the second condition are satisfied, while transmitting the determination request signal to the uplink status determination section and the downlink status determination section when at least one of the first condition and the second condition is not satisfied.

5. The downlink propagation path quality information transmitting apparatus according to claim 3, wherein the timing generation section comprises:

a scheduled period derivation section that derives a scheduled period in which transmission of the downlink propagation path quality information in a compressed mode is scheduled based on the extracted control parameter and outputs a scheduled period report signal;

an uplink status determination section that determines, in response to an input of the scheduled period report signal or a determination request signal, whether a next scheduled period to arrive or a next assumed period to arrive which is different from the scheduled period, satisfies a first condition of not overlapping the uplink transmission gap interval;

a downlink status determination section that determines, in response to the input of the scheduled period report signal or the input of the determination request signal, whether a measurement reference period associated with the next scheduled period to arrive or the next assumed period to affive which is different from the scheduled period, satisfies a second condition of not overlapping the downlink transmission gap interval; and a decision section that decides to generate the timing for transmitting the extra downlink propagation path quality information when the first condition and the second condition are satisfied, while transmitting the determination request signal to the uplink status determination section and the downlink status determination section when at least one of the first condition and the second condition is not satisfied.

* * * * *